US012382554B2

(12) United States Patent
Trice et al.

(10) Patent No.: US 12,382,554 B2
(45) Date of Patent: Aug. 5, 2025

(54) MICROWAVE COOKING APPLIANCE WITH RETRACTING POWER MANAGEMENT

(71) Applicant: Midea Group Co., Ltd., Foshan (CN)

(72) Inventors: Daniel J. Trice, Louisville, KY (US); Brian Langness, Shelbyville, KY (US); Eric Scalf, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 1047 days.

(21) Appl. No.: 17/352,994

(22) Filed: Jun. 21, 2021

(65) Prior Publication Data

US 2022/0304119 A1 Sep. 22, 2022

Related U.S. Application Data

(63) Continuation-in-part of application No. 17/207,379, filed on Mar. 19, 2021.

(51) Int. Cl.

| | |
|---|---|
| ***H05B 6/80*** | (2006.01) |
| ***B65H 75/48*** | (2006.01) |
| ***H02G 11/00*** | (2006.01) |
| ***H05B 6/64*** | (2006.01) |

(52) U.S. Cl.
CPC ......... *H05B 6/6402* (2013.01); *B65H 75/486* (2013.01)

(58) Field of Classification Search
CPC ... B65H 2701/34; H05B 6/6426; H02G 11/02
See application file for complete search history.

(56) References Cited

U.S. PATENT DOCUMENTS

| | | | | |
|---|---|---|---|---|
| 2,157,887 | A | 5/1939 | Davis | |
| 3,427,719 | A | 2/1969 | Gordon | |
| 4,357,513 | A | 11/1982 | Kawata et al. | |
| 4,666,113 | A | 5/1987 | Itoh et al. | |
| 5,369,255 | A * | 11/1994 | Sherer | A47J 47/14 219/739 |
| 5,450,874 | A | 9/1995 | Hamula | |
| 5,622,243 | A | 4/1997 | Kang | |
| 5,645,147 | A | 7/1997 | Kovacik | |
| 5,679,925 | A | 10/1997 | Dilley | |
| 5,818,015 | A | 10/1998 | Lee et al. | |

(Continued)

FOREIGN PATENT DOCUMENTS

| | | | |
|---|---|---|---|
| CN | 106287857 | B | 11/2018 |
| KR | 19980063573 | U | 11/1998 |

(Continued)

*Primary Examiner* — Ibrahime A Abraham
*Assistant Examiner* — Lawrence H Samuels
(74) *Attorney, Agent, or Firm* — Gray Ice Higdon

(57) ABSTRACT

A microwave cooking appliance having power management. The appliance may include at least one cord positionable between at least one stowed position to at least one deployed position. The appliance may include one or more strain relief members stopping the deployment of the cord. The microwave cooking appliance may include a cord housing. The microwave cooking appliance may include a pulley engaging the cord. The microwave cooking appliance may include a biasing member engaging the pulley and/or cord. The microwave cooking appliance may include a pin and slot engagement engaging the pulley and/or cord.

20 Claims, 11 Drawing Sheets

(56) References Cited

U.S. PATENT DOCUMENTS

| | | | | |
|---|---|---|---|---|
| 6,660,984 | B1 | 12/2003 | Jeong et al. | |
| 6,737,622 | B1 | 5/2004 | Jeong et al. | |
| 6,759,636 | B2 | 7/2004 | Stutman | |
| 6,854,575 | B1 * | 2/2005 | Desormeaux | H02G 11/02 191/12.4 |
| 7,345,264 | B2 | 3/2008 | Yoshidome | |
| 7,452,100 | B2 | 11/2008 | Swartfager | |
| 7,538,272 | B1 | 5/2009 | Shotey | |
| 8,067,715 | B2 | 11/2011 | Peterson et al. | |
| 9,820,398 | B1 | 11/2017 | Hall et al. | |
| 2004/0178195 | A1 | 9/2004 | Kim | |
| 2006/0191923 | A1 * | 8/2006 | Yoshidome | H05B 6/6429 126/340 |
| 2007/0193999 | A1 | 8/2007 | Peterson | |
| 2008/0190914 | A1 | 8/2008 | Gibson | |
| 2010/0147580 | A1 * | 6/2010 | Koesterich | B65H 75/446 174/520 |
| 2013/0001216 | A1 * | 1/2013 | Day | H05B 3/68 219/521 |
| 2013/0068870 | A1 * | 3/2013 | Feldstein | B65H 75/486 242/381 |
| 2013/0082044 | A1 | 4/2013 | Doan | |
| 2015/0069035 | A1 | 3/2015 | Farah | |
| 2016/0006189 | A1 | 1/2016 | Morehead | |
| 2017/0081146 | A1 | 3/2017 | Dockray | |
| 2017/0215643 | A1 | 8/2017 | Beach | |
| 2019/0282029 | A1 | 9/2019 | Goldberg | |
| 2019/0373999 | A1 | 12/2019 | Nauertz | |
| 2020/0354185 | A1 | 11/2020 | Kohli et al. | |
| 2022/0304121 | A1 | 9/2022 | Trice | |

FOREIGN PATENT DOCUMENTS

| | | |
|---|---|---|
| KR | 19990023549 | 7/1999 |
| WO | WO2018121846 A1 | 7/2018 |

* cited by examiner

MICROWAVE COOKING APPLIANCE WITH RETRACTING POWER MANAGEMENT

BACKGROUND

The present embodiments relate to a microwave cooking appliance integrated with power management.

Typical microwave cooking appliances may have a cord fixed to the exterior to the appliance housing. It can be difficult for the user to handle the entire cord or cord length when installing the appliance, as well as, potentially damaging the exterior of the appliance, the cord itself, or its surroundings with the cord (e.g. connector/plug end). Thus, there is a need for stowing the cord, or portions thereof, within the microwave cooking appliance until deployment by the user.

SUMMARY

In some embodiments of the invention, for example, a microwave cooking appliance may include a housing having a cooking cavity. In various embodiments, the appliance may include a door movable between a closed position closing a front opening to define a portion of the cooking cavity and an open position different from the closed position. In some embodiments, the appliance may include a cord housing having a cord cavity and positioned within the housing. In various embodiments, the appliance may include a cord having a length. Moreover, in some embodiments, the cord is positionable between at least one stowed position within the cord cavity and one or more deployed positions out of the cord cavity. In addition, in various embodiments, the appliance may include a strain relief member attached to the cord within the cord cavity and when in a first deployed position of the one or more deployed positions stops a first length portion of the length from being deployed from the cord cavity.

In some embodiments, the housing may include a top wall and a bottom wall interconnected by a pair of side walls, wherein the cord housing longitudinally extends between the cooking cavity and one of the pair of side walls from the top wall towards the bottom wall. In various embodiments, the cord housing may include an inlet and an outlet adjacent a top wall of the cord housing, wherein when in at least one stowed position a second length portion of the length may be fixed at the inlet and extends downwardly towards a bottom wall of the cord housing before arcuately turning back towards the top wall of the cord housing and extending through the outlet, and wherein the second length portion is larger than the first length portion. In some embodiments, when in a second deployed position a third length portion of the length may be fixed at the inlet and extends downwardly towards the bottom wall of the cord housing before arcuately turning back towards the top wall of the cord housing and extending through the outlet, and wherein the third length portion is larger than the first length portion and is smaller than the second length portion. In various embodiments, the cord housing may include an inlet and an outlet adjacent a top wall of the cord housing, and wherein the outlet is more proximal the door than the inlet. In addition, in some embodiments, the strain relief member may include a larger diameter than a remaining portion of the cord. In various embodiments, the housing may include a top wall, wherein the top wall defines an aperture slidably receiving the length of the cord therethrough between at least one stowed position and the one or more deployed positions. In some embodiments, the aperture of the top wall may include a gasket, wherein the gasket seals against the cord.

In various embodiments, a microwave cooking appliance may include a housing having a cooking cavity and a top wall, and wherein the housing includes an aperture through the top wall. In some embodiments, the appliance may include a door movable between a closed position closing a front opening to define a portion of the cooking cavity and an open position different from the closed position. In various embodiments, the appliance may include a cord housing having a cord cavity and positioned within the housing, and wherein the cord housing may include an outlet and an inlet. Moreover, in various embodiments, the appliance may include a cord having a length and fixed adjacent the inlet of the cord housing, wherein the cord may be slidably received through both the aperture of the top wall and the outlet of the cord housing between at least one stowed position within the cord cavity and one or more deployed positions out of the cord cavity. In some embodiments, the appliance may include a strain relief member attaching to the cord within the cord cavity and when in a first deployed position of the one or more deployed positions stops a first length portion of the length from being deployed from the cord cavity.

In addition, in some embodiments, the strain relief member may be engaged with at least one of the outlet of the cord housing and the aperture of the top wall when in the first deployed position and is disengaged from at least one of the outlet of the cord housing and the aperture of the top wall when in a position different from the first deployed position. In various embodiments, the cord housing may be elongated between a top wall and opposing bottom wall interconnected by a back wall and a front wall, wherein the inlet and the outlet may be adjacent the top wall. Moreover, in some embodiments, when in at least one stowed position, the length of the cord may depend downwardly from the inlet adjacent the top wall along the back wall, arcuately along the bottom wall towards the front wall, and extends upwardly adjacent the front wall towards and through the outlet adjacent the top wall. In various embodiments, the length of the cord includes a U-shape within the cord housing, wherein the U-shape may decrease in size from at least one stowed position towards the first deployed position. In some embodiments, the inlet of the cord housing may be more proximal to a front side of the appliance than the outlet of the cord housing. In various embodiments, at least one of the aperture of the top wall and the outlet of the cord housing may include a gasket, wherein the gasket seals against the cord and maintains a plug end of the cord exterior to the aperture of the top wall when the cord is in at least one stowed position and the one or more deployed positions. In some embodiments, the strain relief member may be an overmolded member having a larger diameter than a remaining portion of the cord.

In some embodiments, a method of managing a power cord of a microwave cooking appliance may include providing a microwave cooking appliance housing having an aperture in communication with a cord housing within the microwave cooking appliance, wherein the cord housing includes a cord having a length with a plug end, wherein the plug end is exterior to the microwave cooking appliance housing. In various embodiments, the method may include stowing a portion of the length of the cord within the cord housing in a stowed position. In some embodiments, the method may include deploying the portion of the cord out of the cord housing from the stowed position through the aperture. In various embodiments, the method may include stopping the deployment of the cord out of the cord housing and the aperture.

In addition, in some embodiments, the method may include sealing the cord adjacent the aperture. Moreover, in various embodiments, the method of stopping the deploying of the cord may include a strain relief member attached to the cord. In some embodiments, the method may include engaging the strain relief member from a disengaged position within the cord housing. In various embodiments, the cord may include a single arcuate curve adjacent a bottom wall of the cord housing between an inlet and an outlet adjacent a top wall of the cord housing.

In some embodiments of the invention, for example, a microwave cooking appliance may include a housing having a cooking cavity. In various embodiments, the appliance may include a door movable between a closed position closing a front opening to define a portion of the cooking cavity and an open position different from the closed position. In some embodiments, the appliance may include a cord housing having a cord cavity and positioned within the housing. In various embodiments, the appliance may include a cord having a length, wherein the cord may be positionable between at least one stowed position within the cord cavity and one or more deployed positions out of the cord cavity. In some embodiments, the appliance may include a pulley translating and rotating within the cord housing to retract the cord towards at least one stowed position or the one or more deployed positions.

In some embodiments, the appliance may include a biasing member urging the pulley in at least one linear direction. In various embodiments, the cord housing may include an inlet and an outlet adjacent a top wall of the cord housing, wherein when in a first deployed position of the one or more deployed positions a first length portion of the length is fixed at the inlet and extends downwardly towards a bottom wall of the cord housing before arcuately turning back around the pulley towards the top wall of the cord housing and extending through the outlet, and wherein when in the first deployed position the biasing member includes a first tension force. Moreover, in some embodiments, when in a second deployed position a second length portion of the length, shorter than the first length, is fixed at the inlet and extends downwardly towards the bottom wall of the cord housing before arcuately turning back around the pulley towards the top wall of the cord housing and extending through the outlet, and wherein when in the second deployed position the biasing member includes a second tension force larger than the first tension force. In some embodiments, the biasing member may be a compression spring. In various embodiments, the appliance may include a pin and slot engagement having a pin and slot, wherein the pulley rotatably engages the pin and translates with the pin in the slot. In some embodiments, the appliance may include a biasing member within the slot, wherein the pin and the pulley varies a tension force of the biasing member when translating. In some embodiments, the appliance may include a strain relief member attaching to the cord within the cord cavity and when in a first deployed position of the one or more deployed positions stops a first length portion of the length from being deployed from the cord cavity. In addition, in some embodiments, the appliance may include one or more cord catches maintaining the cord in at least one deployed position of the one or more deployed positions.

In various embodiments, a microwave cooking appliance may include a housing having a cooking cavity and a top wall. In some embodiments, the housing may include an aperture through the top wall. In various embodiments, the appliance may include a door movable between a closed position closing a front opening to define a portion of the cooking cavity and an open position different from the closed position. In some embodiments, the appliance may include a cord having a length, wherein the cord may be positionable between at least one stowed position within the housing and one or more deployed positions out of the aperture of the housing. In various embodiments, the appliance may include a pulley within the housing slidably engaging the cord between at least one stowed position or the one or more deployed positions. In addition, in some embodiments, the appliance may include a pin and slot engagement within the housing having a pin and slot, wherein the pulley rotatably engages the pin and translates with the pin in the slot when slidably engaging the cord between at least one stowed position and the one or more deployed positions to retract the length of the cord into the housing.

In addition, in some embodiments, the appliance may include a biasing member urging the pulley in at least one linear direction. In various embodiments, increasing a portion of the length of the cord from the housing increases a tension force of the biasing member. In some embodiments, the biasing member may be a compression spring. In various embodiments, the biasing member may be positioned within the slot, wherein the pin and the pulley varies a tension force to the biasing member when translating. In various embodiments, the length of the cord may include a U-shape within the housing when engaging the pulley, wherein the U-shape decreases in size from at least one stowed position towards a first deployed position of the one or more deployed positions. In some embodiments, the slot may extend in a linear direction parallel to an axis of the aperture of the housing. In various embodiments, the appliance may include one or more cord catches releasably engaging the cord to maintain the cord in at least one deployed position of the one or more deployed positions.

In some embodiments, a method of managing a power cord of a microwave cooking appliance may include providing a microwave cooking appliance housing having an aperture within the microwave cooking appliance, wherein the housing includes a cord having a length with a plug end. In various embodiments, the method may include stowing a first portion of the length of the cord within the housing in a stowed position. In some embodiments, the method may include deploying a second portion of the cord out of the housing from the stowed position through the aperture to a deployed position. In various embodiments, the method may include retracting a third portion of the cord within the housing using a pulley.

In addition, in some embodiments, the method include stopping the deploying of the cord out of the aperture of the housing, wherein stopping the deploying of the cord includes a strain relief member attached to the cord. In various embodiments, the method may include sealing the cord adjacent the aperture. In some embodiments, the method may include tensioning the pulley to increase a tension force of a biasing member when increasing the length of the cord out of the housing from the stowed position to the deployed position to retract the third portion of the cord. In various embodiments, the method may include translating and rotating the pulley when deploying the second portion of the cord out of the housing from the stowed position to the deployed position. In some embodiments, the cord may include a single arcuate curve progressively and slidably engaging the pulley. In various embodiments, the method may include releasably engaging one or more cord catches to maintain the cord in at least one deployed position of the one or more deployed positions.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
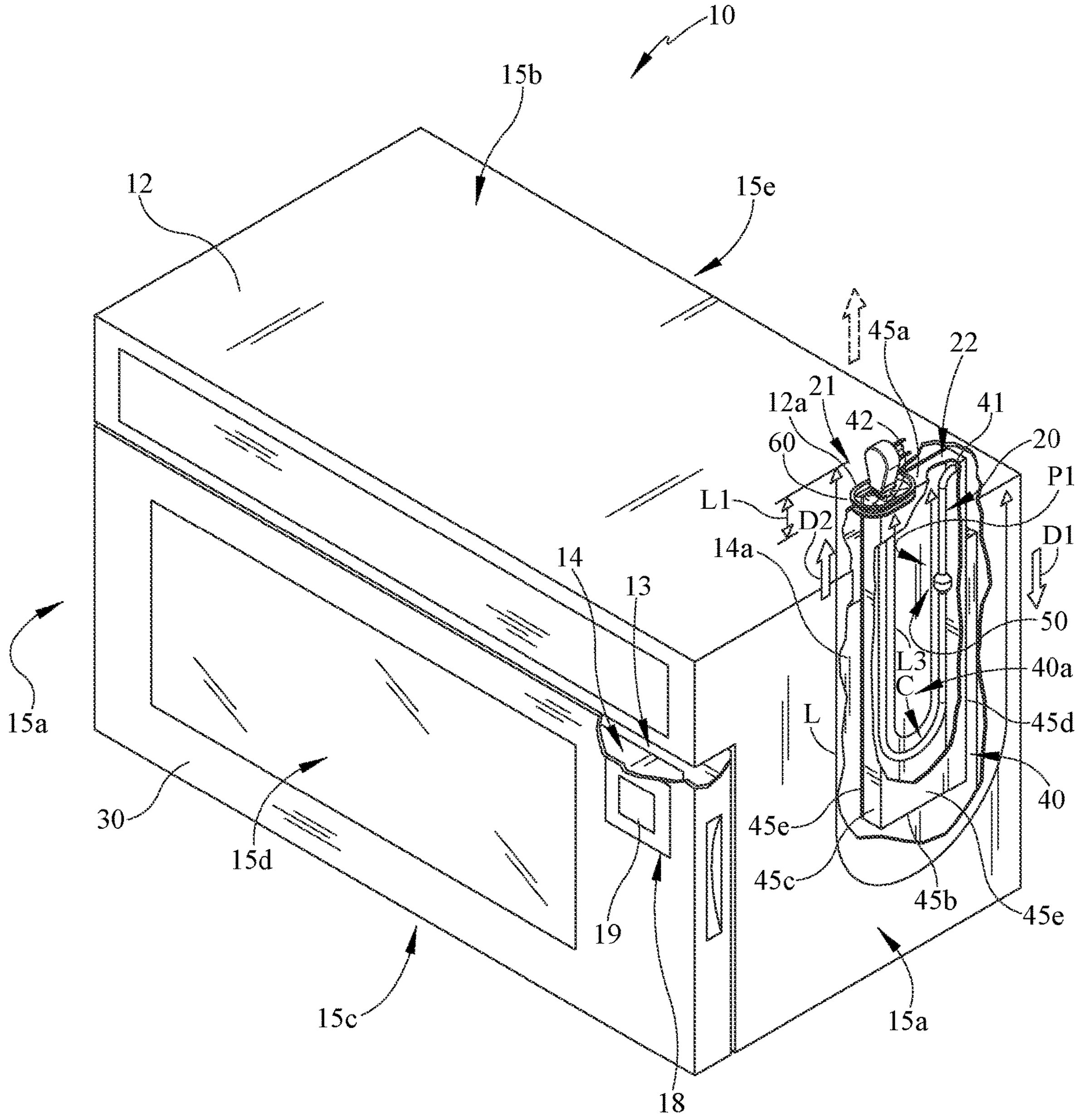
FIG. 1 is a perspective view of an embodiment of a microwave cooking appliance with portions of the appliance housing and the cord housing broken away illustrating an embodiment of a cord in a stowed position.

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a microwave cooking appliance, such as the type that may be used in single-family or multi-family dwellings, or in other similar applications. However, it will be appreciated that the herein-described techniques may also be used in connection with other types of microwave cooking appliances in some embodiments. For example, the herein-described techniques may be used in commercial applications in some embodiments.

Turning now to the drawings, wherein like numbers denote like parts throughout the several views, FIGS. 1-5 illustrate an example microwave cooking appliance 10 in which the various technologies and techniques described herein may be implemented to manage the power cord. Microwave cooking appliance 10 is a residential-type microwave cooking appliance, and as such includes a housing or enclosure 12, which further includes a cooking cavity 14, as well as a door 30 to form a portion of the cooking cavity 14. The door 30 may be disposed adjacent a front side of the cooking cavity 14, appliance 10, or housing 12. The door 30 may be movable or postionable between a closed position (FIG. 1) closing a front opening 13 of the housing 12/cooking cavity 14 to define a portion of the cooking cavity. The open position, not shown, is different form the closed position.

The microwave cooking appliance 10 may also include one or more user activated controls 18, which may be in the form of buttons, knobs, a touchscreen, or the like. In some embodiments, these user activated controls 18 may be used to program a cooking time and/or a cooking power level. In addition, in some embodiments, these user activated controls 18 may be used to select one or more preset conditions for a particular food item to be cooked or a particular desired action (e.g. “popcorn”, “defrost”, “frozen pizza”, etc. The microwave cooking appliance 10 may also include a user interface display 19, which may be used to convey a variety of information to a user. For example, in some embodiments, the display 19 may be used to display the time when the microwave cooking appliance 10 is not in use. In other embodiments, the display 19 may be used to display cooking times, power levels, and/or temperatures.

In some implementations, the appliance 10 may include at least one power cord 20 powering one or more portions of the appliance (e.g. cooking cavity, controls, motor, energization of microwaves, turntable, etc.). The cord 20 is positionable between one or more stowed positions (FIG. 1) and one or more deployed positions (FIGS. 2-5) relative to a cord housing 40/cavity 14 or appliance 10, or portions thereof. The cord 20 is elongated having a length L. One end of the length includes a connector or plug end 21 and the other end or fixed end 22 is fixed inside the housing 12, or cord housing 40. In the one embodiment shown, the plug end 21 of the cord 20 is positioned exterior to the housing 12 or cord housing 40 in the one or more deployed and stowed positions. The plug end 21 may be positioned exterior to an aperture 12*a* and/or outlet 42 of the cord housing 40. In some embodiments, not shown, the plug end may be interior to the aperture in the stowed position. The fixed end 22 of the cord 20 may be fixed at an inlet 41 of the cord housing 40 or within the housing 12, or portions thereof.

Figure 2:
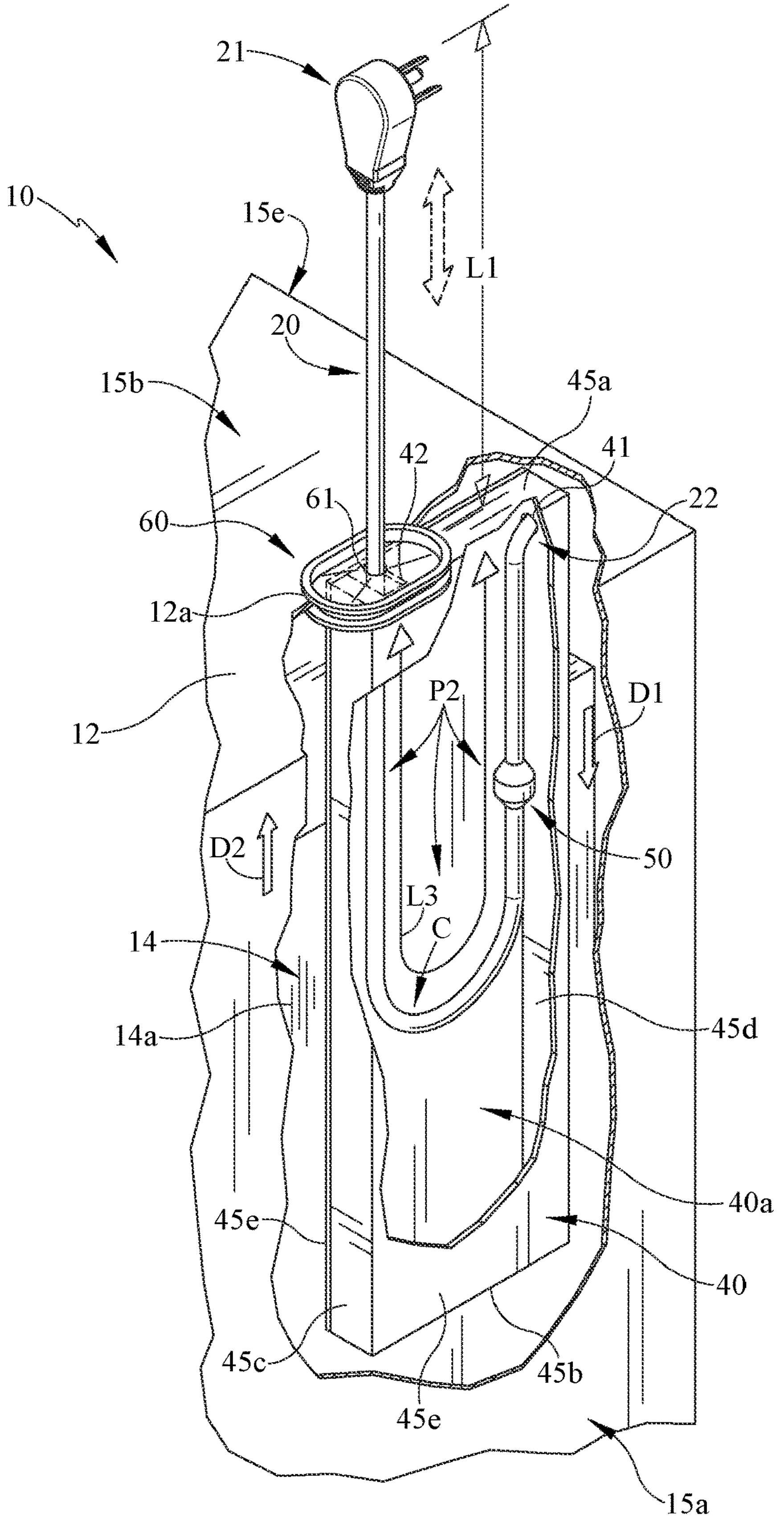
FIG. 2 is an enlarged perspective view of the embodiment of the cord and cord housing of FIG. 1 illustrating the cord in a first deployed position different than the stowed position.
Figure 3:
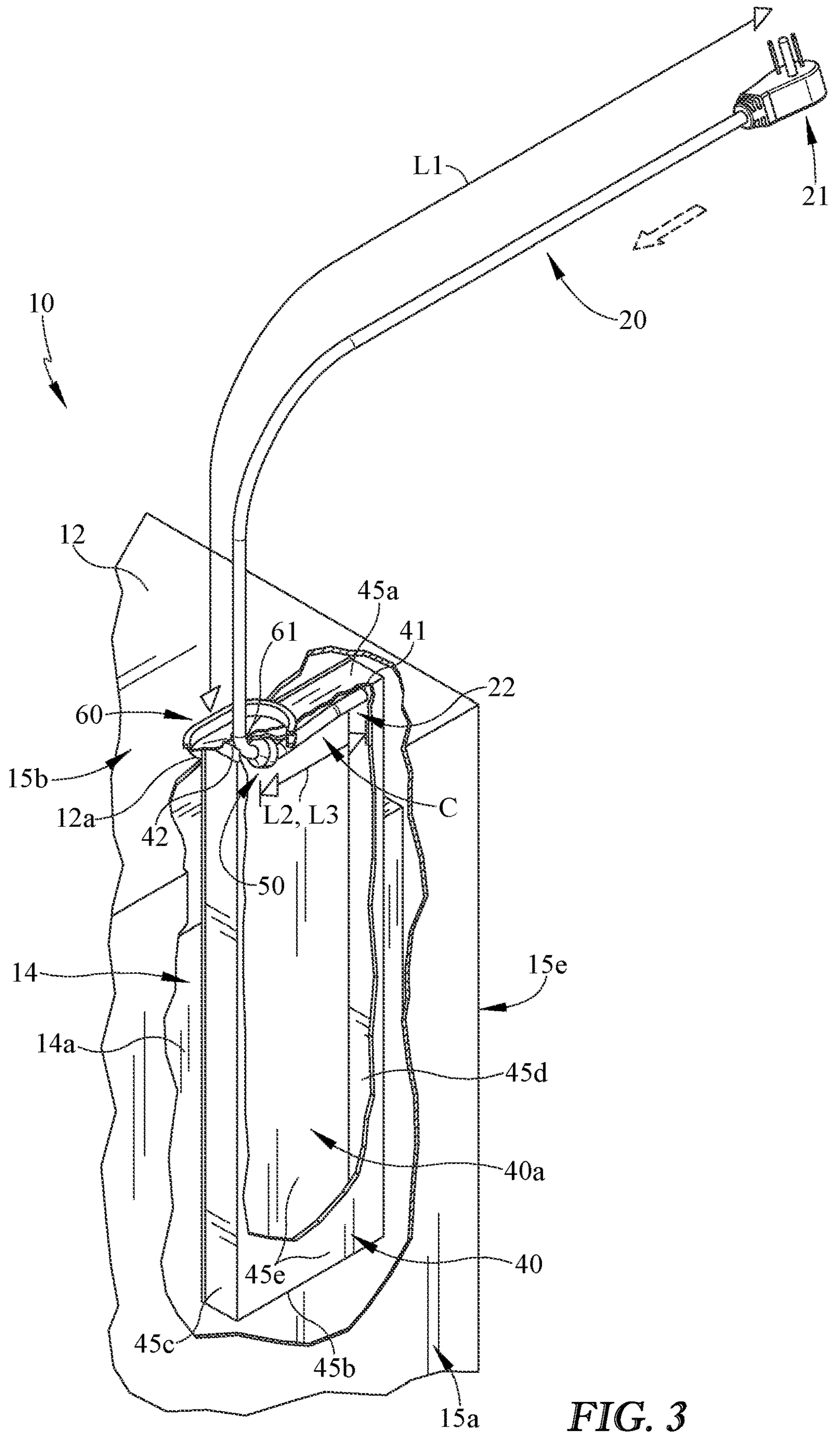
FIG. 3 is an enlarged perspective view of the embodiment of the cord and cord housing of FIG. 1 illustrating the cord in a stopped position and/or second deployed position different from the first deployed position, and illustrating an embodiment of the strain relief member being engaged and stopping deployment of the cord from the appliance and/or cord housing.
Figure 4:
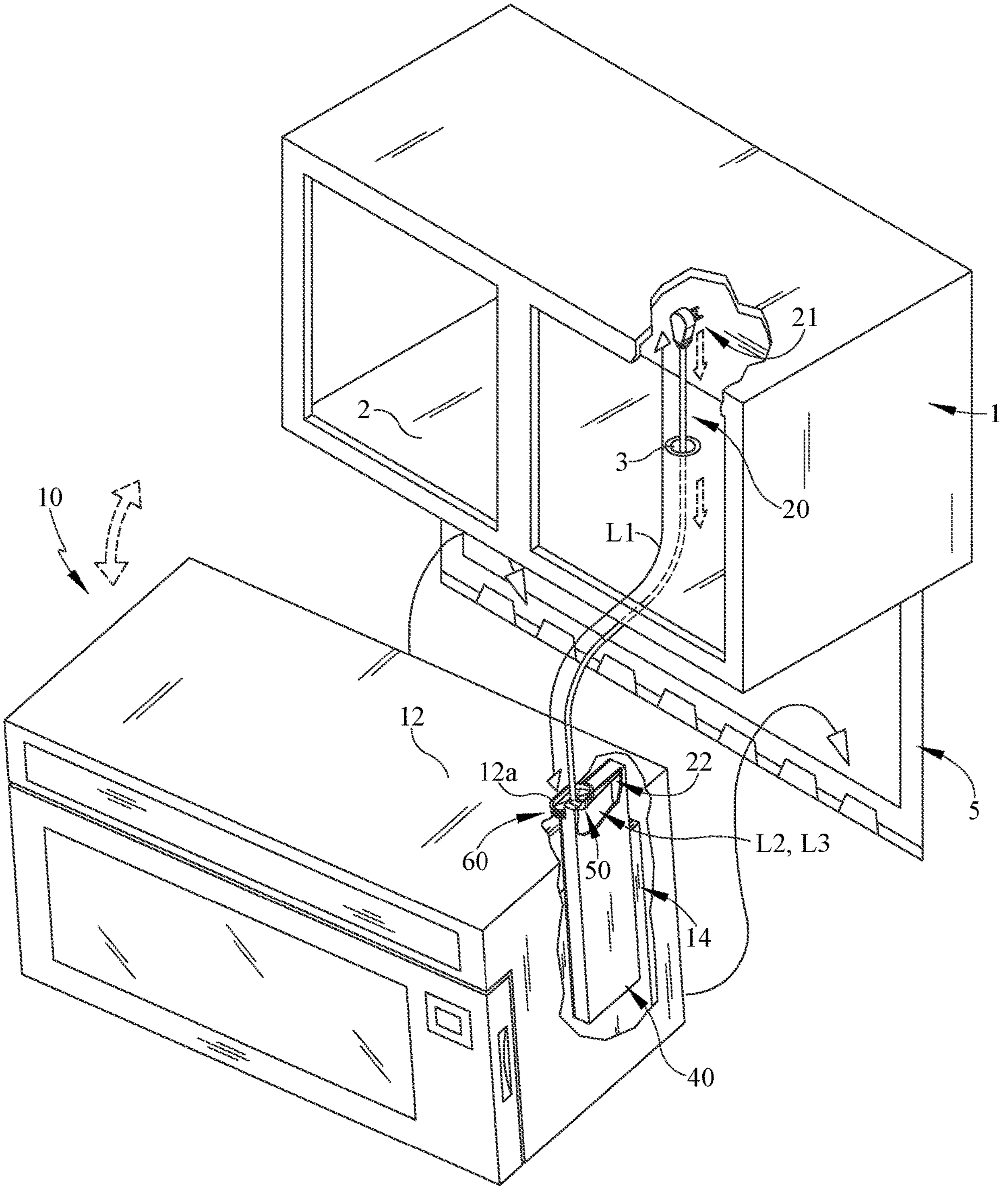
FIG. 4 is a perspective view of the appliance of FIG. 1 illustrating the cord in the stopped position or second deployed position and mounting the appliance in one application underneath a cabinet.
Figure 5:
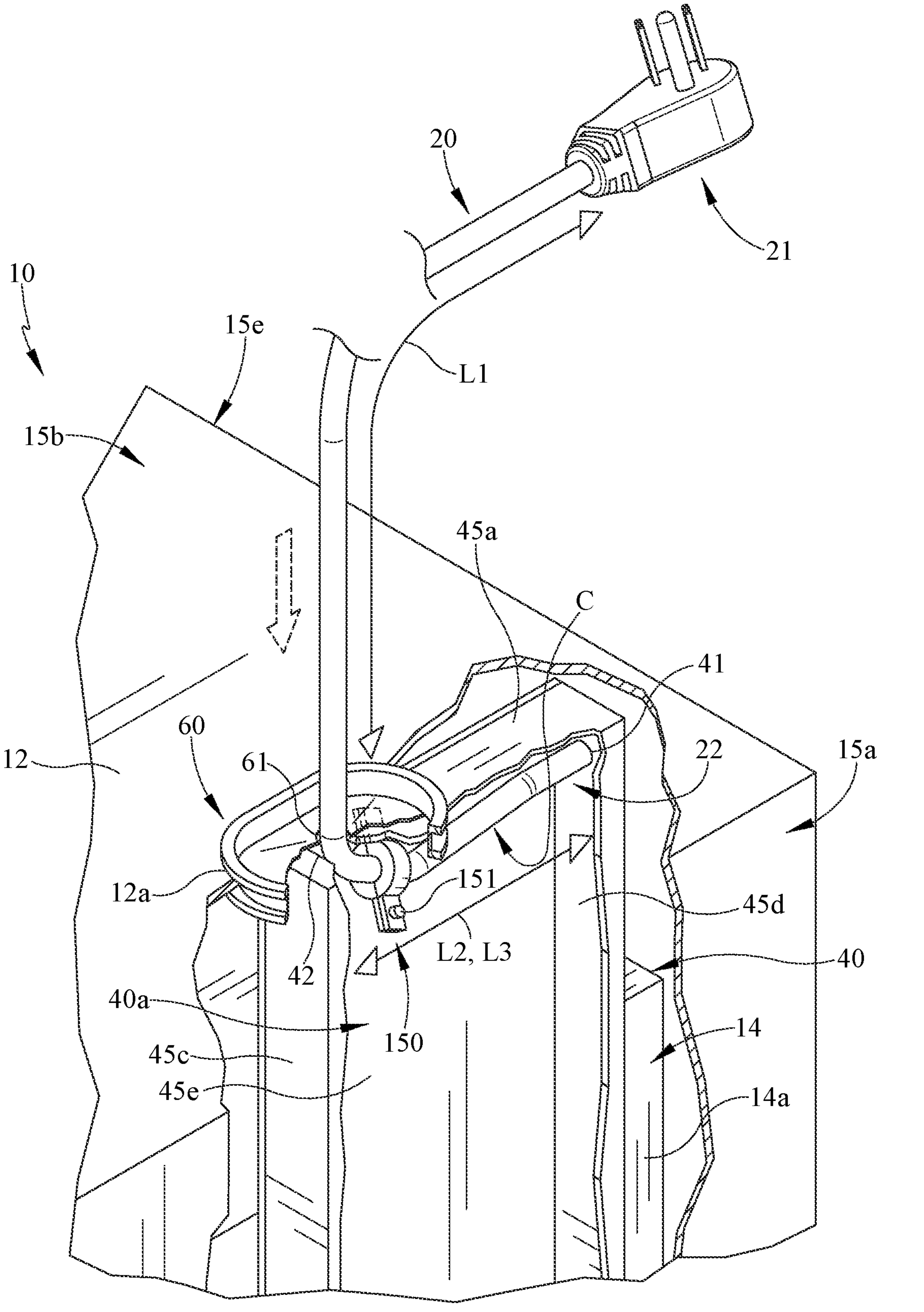
FIG. 5 is an enlarged perspective view of another embodiment of the strain relief member illustrating the cord in the stopped position and/or second deployed position different from the first deployed position, and illustrating an embodiment of the strain relief member being engaged and stopping deployment of the cord from the appliance and/or cord housing.

In some implementations, the appliance 10 and/or cord 20 may include at least one strain relief member 50. The strain relief member 50 may be attached to the cord 20 within the cord cavity 40*a*/housing 40 and/or appliance housing 12 in some embodiments. The strain relief member 50 stops the cord 20 (e.g. length, or portions thereof, of cord 20) deployment in at least one deployed or stopped position as shown in FIGS. 3-5 away from the stowed position (FIG. 1) or closer deployed position (FIG. 2) more proximal the stowed position. The strain relief member 50 stops the deployment of the cord 20 or length L, or portion thereof, of the cord 20 out of the cord/appliance housing 40, 12 (e.g. aperture 12*a*, outlet 42). The strain relief member may allow a length portion L1 of the cord length L to extend from the housing 12 or cord housing 40/cavity 40*a* before the cord 20 is stopped by the strain relief member 50 from extending further. The strain relief member 50 stops a length portion L2 of the cord length L from being deployed from the cord housing 40/cavity 40*a* or portions of the housing 12. In the deployed or stopped position as shown in FIGS. 3-5, another portion or cord length portion L1 of the cord 20 that includes the plug end 21 extends away from the housing 12, 40. The strain relief member 50 is positionable between an engaged position as shown in FIGS. 3-5 and a disengaged position as shown in FIGS. 1 and 2. When in the disengaged position as shown in FIGS. 1 and 2, the strain relief member 50 is disengaged from at least one cord housing wall or housing wall. When in the engaged position, the strain relief member is engages at least one of the cord housing wall (e.g. outlet 42) or housing wall (e.g. aperture 12*a*) stopping further deployment of the cord. When and if the strain relief member 50 is in the engaged position when the cord is in at least one deployed position, the strain relief member 50 of the cord 20 reduces strain placed on the cord (e.g. within the cord housing/appliance housing or the cord fixed end 22, the cord housing inlet 41 and/or outlet 42).

The strain relief member 50, or portions thereof, may be a variety of sizes, shapes, quantities, materials, positions along the length L of the cord 20, and construction and still be within the scope of the invention. As shown in the one embodiment in FIGS. 1-4, the strain relief member 50 is an overmolded member attached or molded onto the outer periphery of the cord 20. The overmolded member may be made of a plastic material, however other materials may be used. The overmolded member or strain relief member 50 includes a larger diameter than the adjacent cord or remaining portion of the cord. The adjacent cord having a smaller diameter or shape is received within, slidably received, or passes through the outlet 42 of the cord housing 40 or housing 12 between the stowed and deployed positions until the larger diameter of the strain relief member 50 engages the smaller diameter outlet of the cord housing or housing (e.g. aperture). In FIG. 5, another embodiment of the strain relief member 150 may be a plastic clip or retainer attached by one or more fasteners 151 to the cord 20 at one or more positions. The strain relief member 50, 150 may be positioned on the cord 20 to vary the cord length L1 available to extend away from the housing 12, 40.

In some implementations, the appliance 10 or housing 12 may include at least one cord housing 40 therein. The cord housing 40 and/or housing 12, or portions thereof, includes or defines a cord cavity 40*a* therein. The cord housing 40 may be positioned within the housing 12. The cord housing 40 may be positioned within or interior of the walls/sides (e.g. side walls 15*a*, top wall 15*b*, bottom wall 15*c*, front wall 15*d*, and back wall 15*e*) of the housing 12. In the one embodiment shown, the cord housing 40 is positioned between the lateral wall 14*a* of the cooking cavity 14 and the housing side wall 15*a*. The cord housing 40 is elongated from the housing top wall 15*b* towards the housing bottom wall 15*c*. The cord cavity 40*a* therein is elongated in the vertical direction. The cord housing 40 may include one or more walls defining the cavity alone, or combined with the housing. As shown in the one embodiments, the cord housing 40 may be elongated and longitudinally extend between a top wall 45*a* and an opposing bottom wall 45*b* interconnected by a front wall 45*c*, a back wall 45*d*, and opposing lateral side walls 45*e*. The cord housing 40 may longitudinally extend between the cooking cavity 14 and the housing side wall 15*a* from the housing top wall 15*b* towards the bottom wall 15*c*. In some embodiments, the cord housing 40 includes an outlet 42 and/or an inlet 41 within one or more walls (e.g. 45*a*-45*e*). In the embodiment shown, the inlet 41 and the outlet 42 are adjacent the top wall 45*a* or upper end of the housing 40, 12. In some embodiments, the outlet 42 may be more proximal to the front side or wall 15*d* of the appliance 10 or door 30 than the inlet 41. The top wall 45*a* may include the outlet 42. The outlet may be the entire top wall in some embodiments and defined by the side walls, front, wall, and back wall. The back wall 45*d* of the cord housing 40 may include the inlet 41. The cord 20 may be fixed adjacent to or at the inlet 41 to the cord housing 40. The cord 20 (e.g. a length or portion thereof) may extend through or be slidably received through the housing 12 (e.g. top wall, aperture) and/or the cord housing 40 (e.g. top wall, outlet) when deployed or stowed. When deployed, the length of cord exterior to the housing increases while the length of cord within the housing decreases. When stowed, the length of cord exterior to the housing decreases while the length of cord within the housing increases.

In some implementations, the appliance housing 12 may include at least one aperture 12*a* in communication with the cord housing 40 or portions thereof (e.g. outlet 42 or cavity 40*a*). Although the aperture 12*a* of the housing is in the top wall 15*b* as shown in the one embodiment, the aperture 12*a* may be positioned within another wall (e.g. side wall, back wall, etc.) of the housing. The aperture 12*a* and the outlet 42 may be the same/different in shape and/or size.

In some implementations, the appliance 10 may include at least one gasket 60 slidably engaging the cord or portion thereof between the stowed and the deployed positions. The housing 12 and/or the cord housing 40, or portions thereof may include the gasket 60 or portion thereof. The aperture 12*a* of the housing 12 and/or the outlet 42 of the cord housing 40 may include the gasket 60 or portion thereof. As shown in the one embodiment, the aperture 12*a* of the housing top wall 15*b* may include the gasket 60. The gasket may be made of a plastic material, however other materials may be used. The gasket 60, if used, may protect the cord from damage as a result of contact with the housing 12 and/or cord housing 40. In various embodiments, the gasket 60 may seal against the cord 20 to prevent fluid from entering the housing 12, cord housing 40, or appliance 10. The gasket 60 may maintain the plug end 21 exterior to the aperture 12*a* of the top wall 15*b* when the cord 20 is in the stowed position and/or deployed position. In some embodiments, the connector or plug end 21 may pass through the gasket 60 to be exterior to the appliance housing 12 or deployed therefrom. For example, when assembled the aperture 61 of the gasket 60 may be able to expand and pass the plug end 21 therethrough and return to the rest or sealing position against the cord (e.g. diameter).

In some embodiments, the cord 20 or portions thereof (e.g. cord length or portions thereof) is positionable between at least one stowed position (FIG. 1) within the cord cavity 40*a*/housing 40 and one or more deployed positions (FIGS. 2-5) out of the cord cavity 40*a*/housing 12. When the cord 20 is being deployed from the stowed position a portion or length L1 of the cord 20 increases exterior to the appliance housing 12 as well as a portion or length L3 of the cord 20 decreases interior to the appliance housing 12/cord housing 40. The cord orientation between the stowed and deployed positions reduces kinking, overlapping, or binding within or from the cord/appliance housing when deploying/stowing. When in the stowed position as shown in FIG. 1, the cord 20 is positioned in a single plane in the direction from the front wall 15*d*, 45*c* of the appliance/cord housing 12, 40 towards the back wall 15*e*, 45*d* of the appliance/cord housing 12, 40. When in the stowed position, a first portion P1 of the length L3 of the cord within the cord housing 40 is fixed at the inlet 41 and extends from the top wall 45*a* downwardly in a first direction D1 towards the bottom wall 45*b*, then curves or arcuately turns (e.g. back around the pulley) along the bottom wall 45*b* from the back wall 45*d* to the front wall 45*c*, and then extends from the bottom wall 45*b* upwardly in a second direction D2, opposite to the first direction D1, towards the top wall 45*a* or outlet 42 of the cord housing 40 and extends through the outlet 42/aperture 12*a*. When in a deployed position as shown in FIG. 2 before being stopped by the strain relief member 50, a second portion P2 of the cord length L3 smaller in length than the first portion P1 of the length L3 is fixed at the inlet 41 and extends downwardly in the first direction D1 along the back wall 45*d* for a shorter distance before arcuately turning (e.g. back around the pulley) along the bottom wall 45*b* towards the front wall 45*c* and extends upwardly along the front wall 45*c* in the second direction D2 for a shorter distance and extends through the outlet 42/aperture 12*a*. The arcuate curve C of the cord 20 within the cord/appliance housing 40, 12 becomes more proximal the top wall 45*a* or increases in elevation when deploying as shown in FIGS. 1-3. When stopped by the strain relief member 50, the arcuate curve C may be progressively reduced or substantially straight when the length L2, L3 remains within the cord housing 40 as shown in FIG. 3. Further, the distances or length of the cord length adjacent the front wall 45*c* and/or back wall 45*d* decreases in length when deploying as shown in FIGS. 1-3. Alternatively, the arcuate curve C of the cord 20 within the cord/appliance housing 40, 12 becomes more proximal the bottom wall 45*b* or decreases in elevation and/or the distances of the cord length adjacent the front wall and/or back wall may increase in length when stowing the cord. The cord or cord length L3 in the cord/appliance housing may be U-shaped when stowed and/or when being deployed. The U-shaped cord or cord length may decrease in size and/or shape from the stowed position to the deployed position, or increase from the deployed position to the stowed position. Further, the cord or cord length L3 within the cord housing may be described as having a single arcuate curve C adjacent the bottom wall 45*b*, between stowed and deployed positions, between the front wall 45*c* and the back wall 45*d* of the cord/appliance housing 40, 12, and/or between the inlet 41 and the outlet 42 of the cord housing 40.

In use, the user may be provided with the microwave cooking appliance 10 having the cord 20 in the stowed position within the cord/appliance housing 40, 12. For example, the appliance may be removed from a box or packaging. The user may grasp the plug end 21 of the cord 20 that may be exterior or interior to the housing 12 and deploy a length of cord. The cord plug end 21 may then be passed through a hole 3 in the bottom 2 of a top cabinet 1. A mounting bracket 5, if used, may be secured to the wall or application. With the cord 20 inserted through the hole 3, the user may lift the microwave cooking appliance 10, tilt it forward, and hook the back bottom edge of the appliance onto the lower tabs of the mounting bracket 5. The appliance 10 may be rotated up against the cabinet bottom and secured. If needed, excess length may be stowed when in the installed position. In some embodiments, the strain relief member 50 may be engaged and may stop the deployment of the cord 20. In various embodiments, the strain relief member 50 may not be engaged if the length L1 is not fully needed to be deployed. Alternatively in some embodiments, the microwave cooking appliance 10 with a stowed cord 20 may be hooked to the mounting bracket 5 and rotated up against the cabinet bottom 2 before the plug end 21 and/or cord 20 may be deployed through the bottom hole 3 of the cabinet 1 because the appliance aperture 12*a*/cord housing outlet 42 may be substantially aligned with the cabinet bottom hole 3.

In some implementations, the microwave cooking appliance 10 may include the cord 20 retracting into the appliance housing 12 and/or cord housing 40 shortening the length L1 of the deployed cord length. As an alternatively to the embodiment shown in FIGS. 1-5 whereby the user may manually assist the cord 20 to retract back into the housing 12, 40, the cord 20 may be retracted or assisted (e.g. automatically) to return to or toward one or more deployed positions or at least one stowed position to shorten the length L1 of the cord deployed as shown in FIGS. 6-11. The retraction of the cord 20 may automatically occur when the user stops deployment of the cord 20 or removes tension (e.g. ungrasping, unplugging from outlet, etc.). The returning force (e.g. tension force) to automatically retract the cord may increase as the length L1 of cord 20 is deployed or increased outside the housing 40, 12 (e.g. cord, appliance). As the user deploys the cord 20 from the appliance 10, or portions thereof, the user may utilize the available length of the cord temporarily deployed before the cord retracts to take up cord slack or excess that is not currently needed. The returning force (e.g. tension force, T1-T3) to retract the cord may be variety of methods or structure to retract the cord with minimal or no assistance by the user. Although not shown, a cord catch may temporarily hold the deployed length of the cord until removed by the user to begin retracting or allow the returning force to retract the cord.

In some implementations, the microwave cooking appliance 10 may include at least one pulley 70. The pulley 70, if used, may be used to retract the cord 20, or portions thereof, within the housing (e.g. cord housing, appliance housing). In some embodiments, the pulley 70 may rotate (e.g. in one or more directions, CW, and/or CCW, about a horizontal axis or axis A, etc.) and/or translate (e.g. in one or more directions, D1, D2, linear, arcuate, in a vertical direction, etc.) when the cord is deployed and/or stowed between one or more positions. As shown in the one embodiment in FIGS. 6-11, the pulley 70 translates and/or rotates when deploying and/or stowing the cord 20, or portions thereof. Further, the cord 20 and/or the arcuate curve C (e.g. single arcuate curve) of the cord may progressively and/or slidably engage the pulley 70 during deployment/stowing. The pulley 70 may translate and/or rotate within the housing (e.g. cord, appliance) when engaging the cord to retract the cord towards or within at least one stowed position or one or more deployed positions to shorten the exterior cord length L1. When deploying the cord length L exterior from the housing 12, 40 as shown from FIGS. 6 to 11, the pulley 70 may rotate clockwise and translate vertically upwards (e.g. vertically, within a slot) from the bottom wall 15*c* of the housing (e.g. cord, appliance) towards the top wall 15*b* of the housing. As such, the return force (e.g. tension force) to retract the cord may increase. When stowing the cord length L, or portion thereof, exterior from the housing as shown from FIGS. 11 to 6, the pulley 70 may rotate counterclockwise and translate vertically downwards (e.g. vertically, within a slot) from the top wall 15*b* of the housing (e.g. cord, appliance) towards the bottom wall 15*c* of the housing. As such, when stowing or retracting the cord the return force (e.g. tension force) may decrease when retracting towards another position. The pulley 70 may include a track or exterior grove 71 engaging the cord 20. The groove 71 may extend about the circumference of the pulley 70. The cord 20 (e.g. arcuate curve C) may only engage a portion of the groove 71 when the pulley is translating and/or rotating. As shown in the one embodiments, the cord 20 may not engage the entire circumference of the pulley or groove 71, or stated alternatively may not overlap about the circumference or pulley. It should be understood that the pulley may be a variety of sizes, shapes, quantities, orientations, positions within the appliance, and constructions and still be within the scope of the invention.

In some implementations, the cooking appliance 10 may include a pin and slot engagement 80. The pin and slot engagement 80, if used, may include at least one pin 81 slidably engaging at least one slot 82. As shown in the one embodiment in FIGS. 6-11, the pulley 70 may rotatably engage the pin 81, or portions thereof. The pulley 70 and/or pin 81, or portions thereof, may translate and/or slide in the slot 82, or portions thereof, when deploying and/or stowing (e.g. slidably engaging) portions of the cord length L. The slot 82 may be positioned in a variety of positions relative to the housing 12, 40. The slot 82 may be positioned within the housing 40, 12 (e.g. cord and/or appliance). As shown in at least FIG. 6, the slot 82 may extend vertically in a linear and/or vertical direction. The slot 82 may extend in a linear direction parallel to an axis of the aperture 12*a* of the housing 12 and/or outlet 42 of the cord housing 40. The pin 81 and/or pulley 70, or portions thereof, may slide within the slot 82 between elevations when progressively engaging the cord 20 (e.g. the U-shape or single arcuate curve C or portions thereof within the housing) between cord positions (e.g. deployed, stowed). The length L3 of the cord 20 may include the U-shaped portion or arcuate curve 20 within the housing when engaging the pulley. The U-shape of the cord within the housing may decrease in size from at least one stowed position towards at least one deployed position (see FIGS. 6-11). For example, when the pulley 70 (e.g. rotates) and the pin 81 and/or pulley 70 slides upwardly in the slot 82 towards the aperture 12*a* or top wall 15*b* of the appliance 10 the U-shape of the cord decreases while increasing the length of the cord exterior to the housing and the tension force to retract, and vice versa. In addition, in some embodiments as shown in FIGS. 6-11, the appliance 10, pin and slot engagement 80, and/or pulley 70 may include one or more bearings 72 between the pin 81 and the pulley 70. The bearing 72, if used, may allow rotation of the pulley 70 in one or more directions about the axis A during stowing/deploying of the cord 20. It should be understood that the pin and slot engagement may be a variety of sizes, shapes, quantities, orientations, positions within the appliance, and constructions and still be within the scope of the invention.

Figure 6:
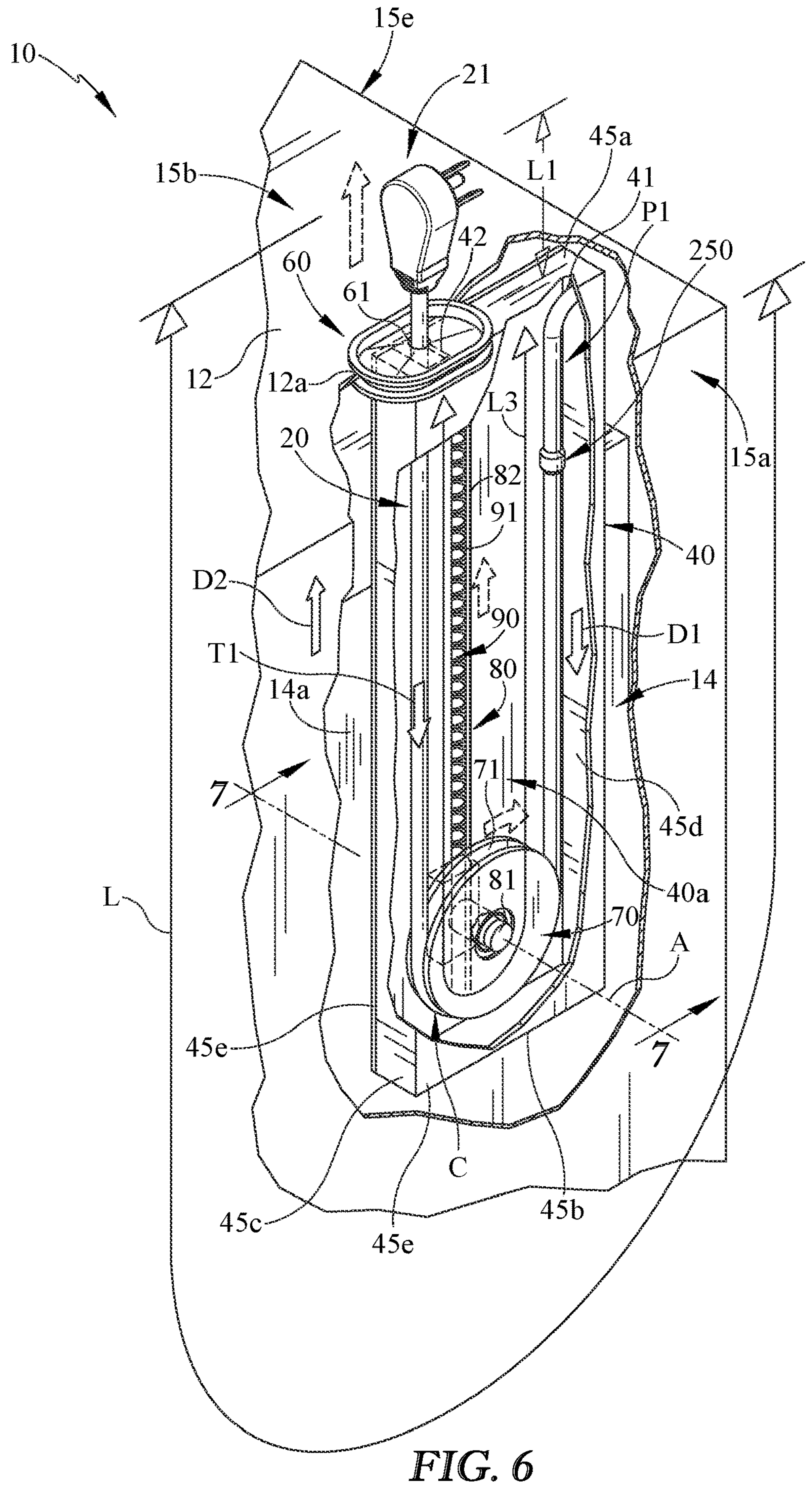
FIG. 6 is an enlarged perspective view of the microwave cooking appliance with portions of the appliance housing and the cord housing broken away illustrating an embodiment of a retracting cord in a stowed position.
Figure 7:
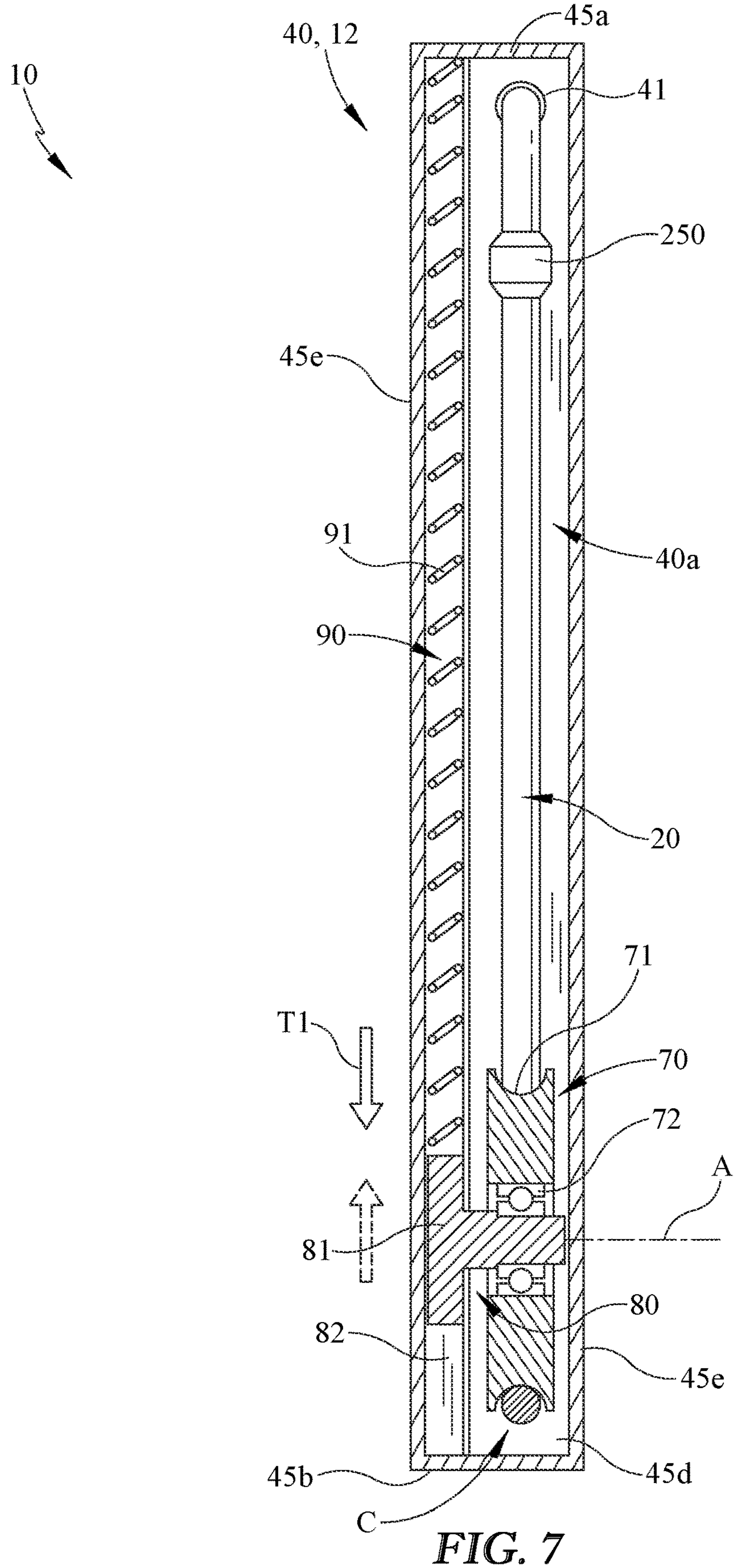
FIG. 7 is a sectional view of the retracting cord embodiment taken along line 7-7 of FIG. 6.
Figure 8:
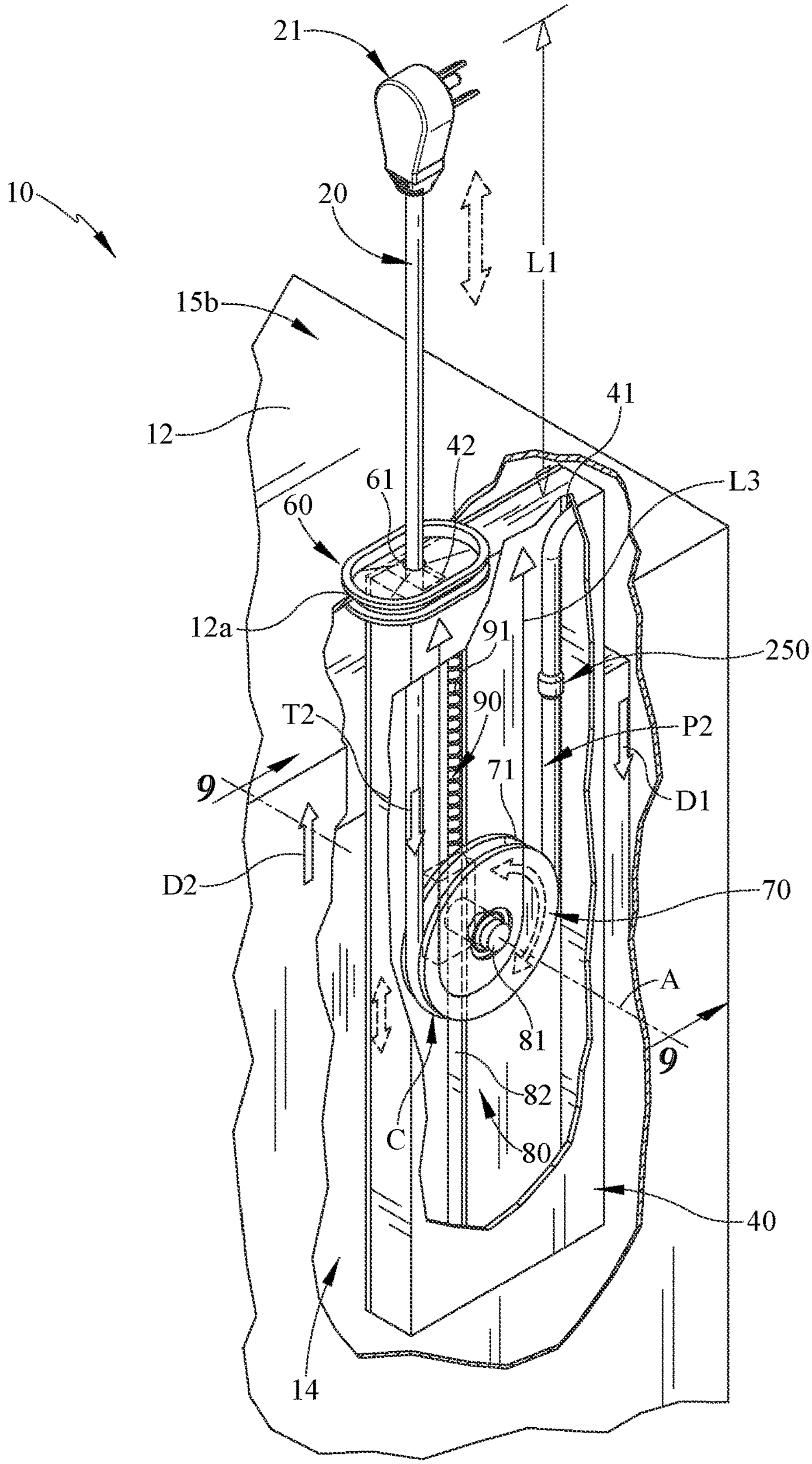
FIG. 8 is an enlarged perspective view of the embodiment of the cord and cord housing of FIG. 6 illustrating the cord in a first deployed position different than the stowed position increasing the tension force to retract the cord.
Figure 9:
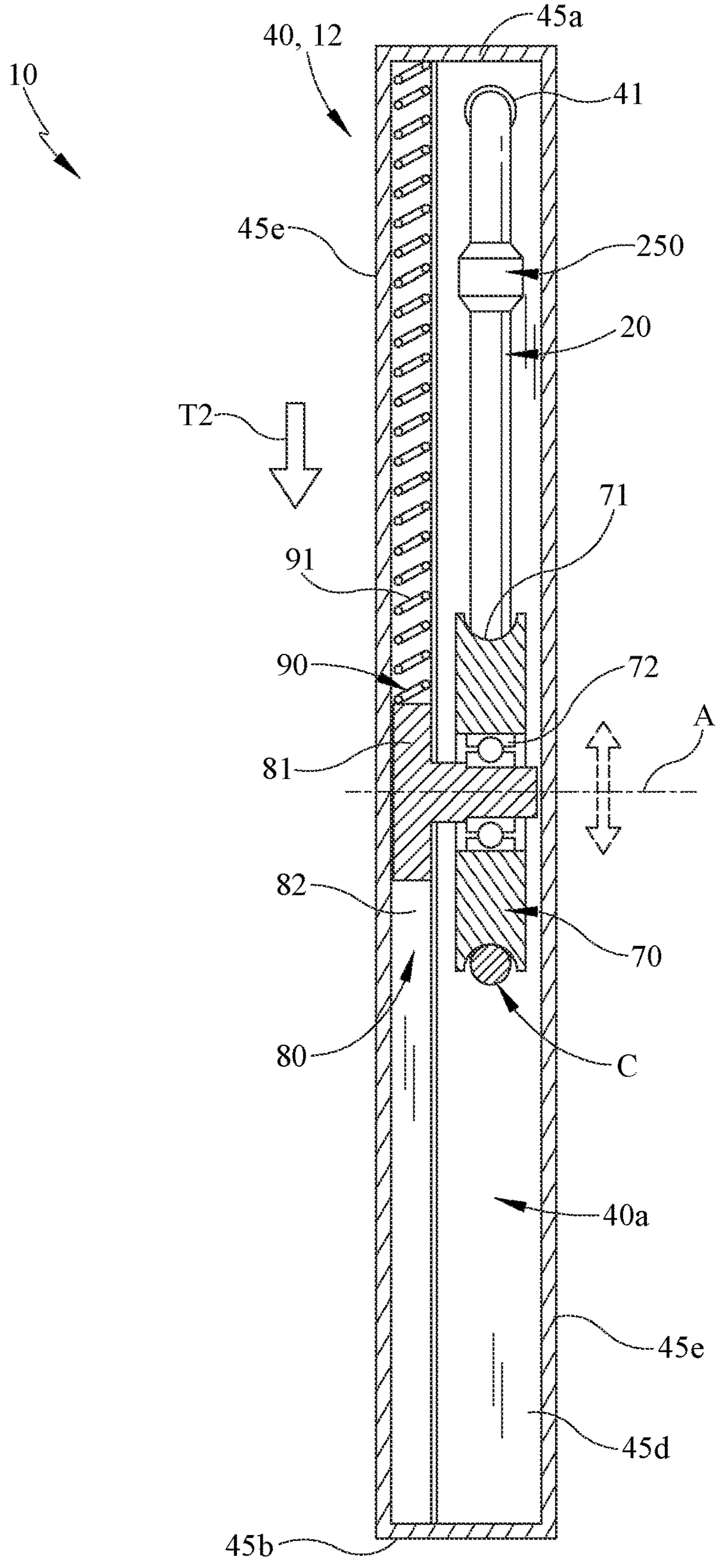
FIG. 9 is a sectional view of the retracting cord embodiment taken along line 9-9 of FIG. 8.
Figure 10:
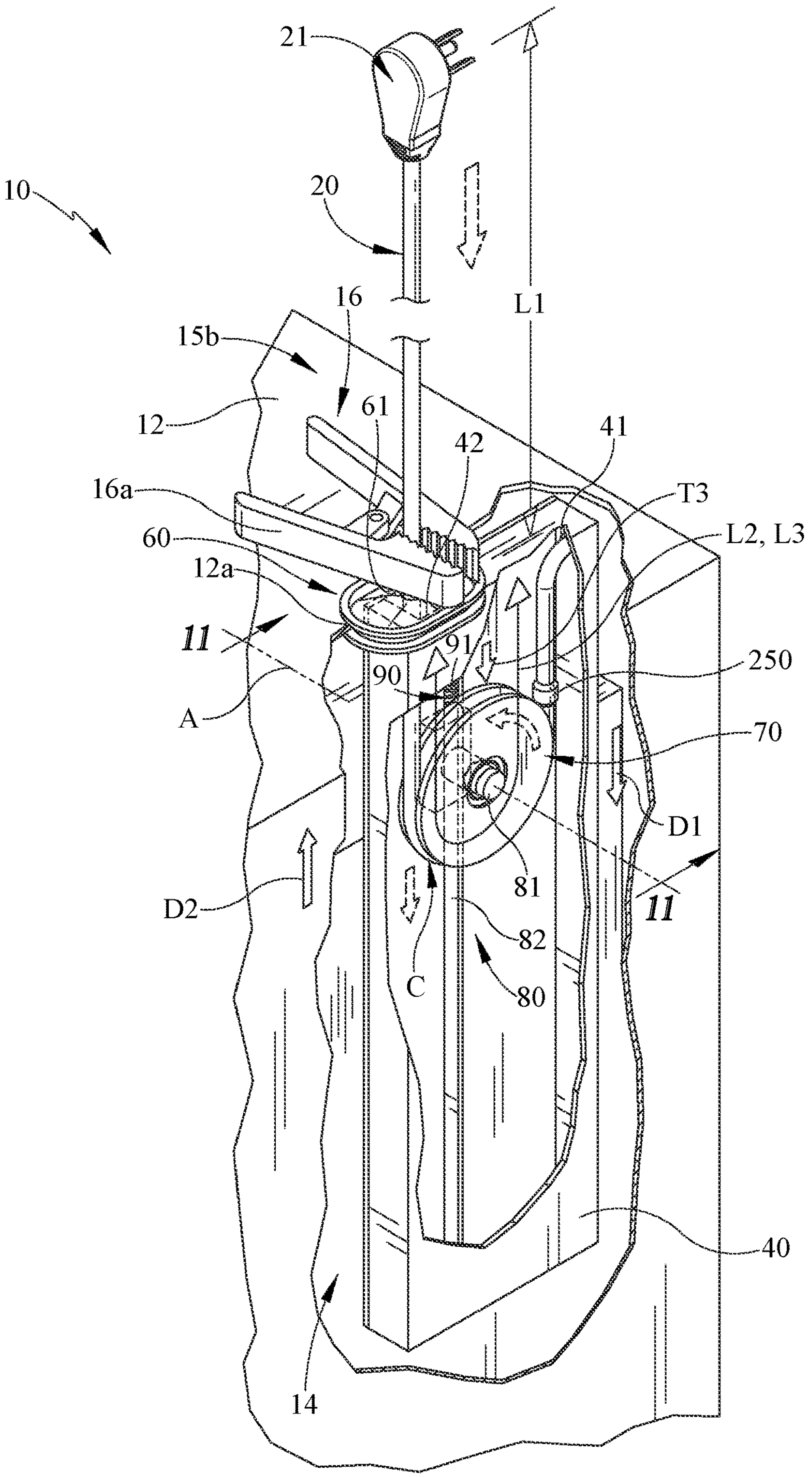
FIG. 10 is an enlarged perspective view of the embodiment of the cord and cord housing of FIG. 6 illustrating the cord in a stopped position and/or second deployed position different from the first deployed position and increasing the tension force more than first deployed position, and illustrating an embodiment of the strain relief member being engaged and stopping deployment of the cord from the appliance and/or cord housing.
Figure 11:
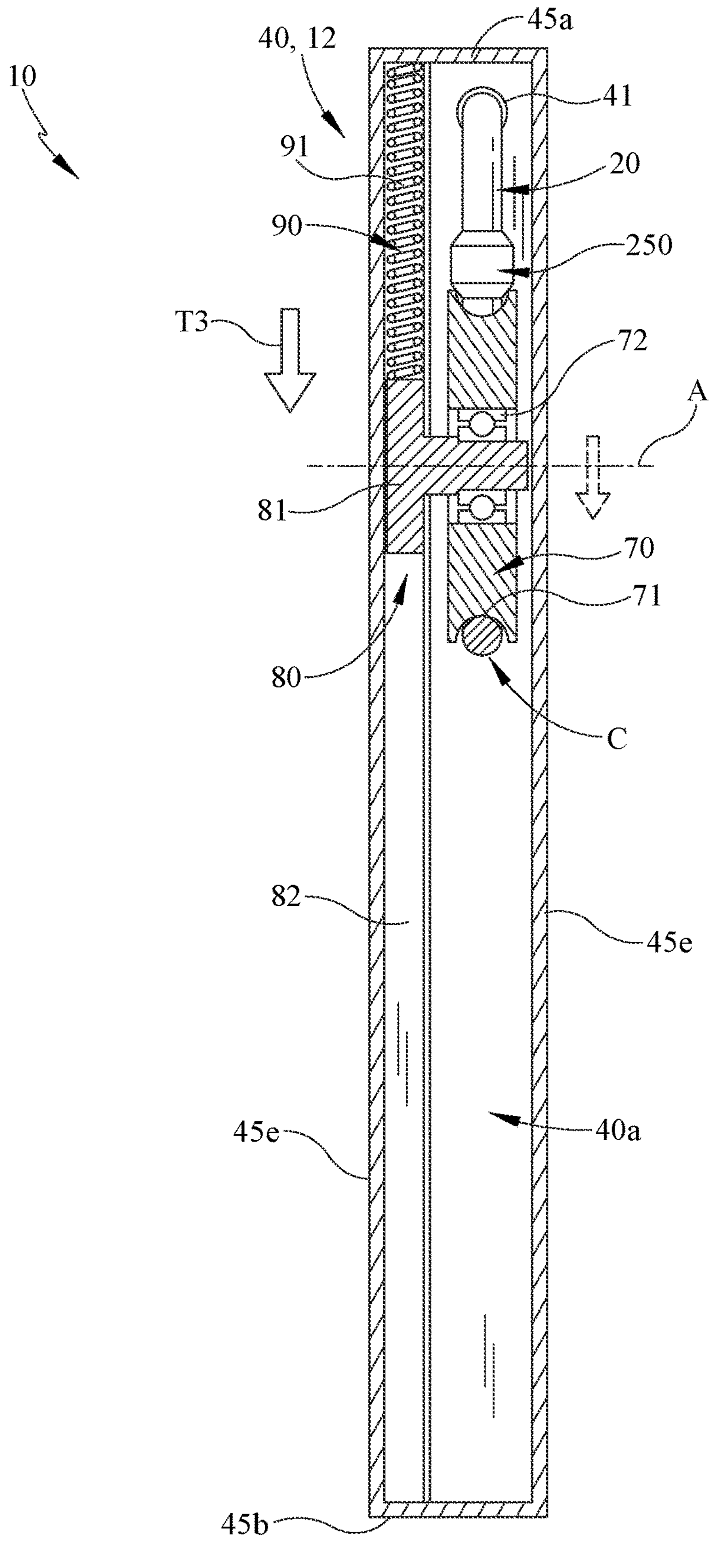
FIG. 11 is a sectional view of the retracting cord embodiment taken along line 11-11 of FIG. 10.

In some implementations, the microwave cooking appliance 10 or portions thereof may include one or more biasing members 90. The one or more biasing members, if used, may include a tension force (e.g. T1, T2, T3, etc.) to urge or retract the cord 20, or portions thereof. The portions of the cord 20, pulley 70, and/or pin 81 may urge, vary, and/or apply the tension force to in one or more directions to the one or more biasing members (e.g. at least one linear direction, downwardly, and/or vertically) when translating between the deployed/stowed positions. In some embodiments, the biasing member 90 may be positioned in the slot 82 of the pin and slot engagement 80. The pin 81, pulley 70, and/or cord 20 (e.g. when translating and/or rotating) may vary the tension force of the biasing member 90 when the cord is positioned between the one or more stowed positions and at least one stowed position. The tension force (e.g. T1, T2, T3, etc.) of the biasing member 90 increases when the length L1 of cord 20, or portion thereof, increases from the appliance 10 or housing 12, 40, thereby the tension force urges the cord 20 to retract back into the housing 12, 40 when applied to pin/pulley/biasing member trying to returning to the resting state (e.g. downwardly, away from the deployed position) or towards a stowed position. Tensioning the pulley 70 and/or pin 81, when deploying the cord 20, increases the tension force of the biasing member 90 to retract the cord 20, or portions thereof. When the cord 20 is in the stowed position as shown in FIGS. 6 and 7, the biasing member 90 may have a first tension force T1 (e.g. zero, rest, or some force value different from when a portion of the cord is deployed) such that the biasing member 90 positions the cord in a retracted or stowed position (e.g. fully retracted) when the pulley and/or pin is adjacent the bottom end of the slot away from aperture/top wall/outlet. When the cord is in at least one first deployed position as shown in FIGS. 8 and 9, the biasing member 90 may have a second tension force T2 (e.g. greater than the first tension force T1) such that the biasing member 90 urges the cord from the deployed position towards the stowed position. When the cord is in at least one third deployed position as shown in FIGS. 10 and 11, the biasing member 90 may have a third tension force T3 (e.g. greater than the second tension force) such that the pulley and/or pin is adjacent the top end of the slot closest to the aperture/top wall/outlet such that the biasing member 90 urges the cord from the third deployed position towards the stowed position. Although other types of springs may be used, a compression spring 91 is shown being used in the one embodiment in FIGS. 6-11. The compression spring 91 decreases in height as the cord is deployed thereby increasing the tension force to retract the cord. For example, an extension spring may be used in some embodiments.

In some implementations, the appliance may include a weighted structure(s) to retract the cord. One or more weighted members may be secured to the one or more embodiments of the cord shown in the Figures. The weight or structure may be included in the pulley and/or pin and slot engagement to automatically retract the cord. The pulley 70 and/or pin and slot engagement 80, or portions thereof, may be of a weight to retract the cord 20 to return within the housing. The weight of the pulley 70, cord 20, and/or pin 81 may urge the cord to retract. As the weighted structure, pully, pin, and/or cord increases in elevation, within the slot 82, the potential energy increases thereby urging/biasing the cord to return downwardly towards the stowed/deployed position and shortening the length L1 of the cord. The biasing member 90 may or may not be used in some of the embodiments. Further, the strain relief member 50, 150, 250, if used, may be weighted to retract the cord in some embodiments without the pulley and/or pin and slot.

In some implementations as shown in FIGS. 6-11, the appliance 10 may include a strain relief member 250 attached to the cord and when in a deployed position of the one or more deployed positions stops a length portion L2 of the cord length from being deployed from the cord housing and/or housing 12. The strain relief member 250, if used, may engage the pulley 70/aperture 12*a*/outlet 42, or other portions of the housing, and stops the cord 20 (e.g. length, or portions thereof, of cord 20) deployment in at least one deployed or stopped position as shown in FIGS. 10 and 11 away from the stowed position (FIG. 6). As shown in the one embodiment in FIGS. 10 and 11, the strain relief member 250, attached to the cord 20, may engage the pulley and stops deployment of the cord 20 or length L, or portion thereof, of the cord 20 out of the cord/appliance housing 40, 12 (e.g. aperture 12*a*, outlet 42). Alternatively, in some embodiments, the pulley 70, or portions thereof, may be the strain relief member and may stop deployment of the cord 20 or length L2, or portion thereof, of the cord 20 from the cord/appliance housing. When a pulley is used, the strain relief 250, if used, may engage other structure of the appliance to stop the deployment of the cord.

In some implementations, the microwave cooking appliance 10 or portions thereof may include one or more cord catches 16 holding the cord length L1 deployed from the appliance, or portions thereof. The one or more cord catches maintain the cord in at least one deployed position of the one or more deployed positions. The one or more cord catches 16 may releasably engage or grips the cord 20, pulley 70, biasing member 90, and/or pin and slot engagement 80 to maintain the cord in at least one deployed position of the one or more deployed positions. In the one embodiment shown in FIG. 10, the cord catch 16 may temporarily hold the deployed length L1 of the cord until removed or disengaged by the user. In some embodiments, the cord catch may be permanently attached or permanently hold the deployed length of the cord. One embodiment of the cord catch 16, if used, shown in FIG. 10 is a spring loaded clip 16*a* to releasably engage the cord (e.g. periphery) at the desired deployed length L1. When the cord length is desired to retract into the appliance, the user may remove or disengage the cord catch 16*a*, if used, to begin retracting or allow the returning force to retract the cord. Although the cord catch 16 is shown as separable/releasable from the appliance and/or cord in the one embodiment, the cord catch may be fixed to the appliance or portions thereof (e.g. internal and/or external to the housing 12) and still be within the scope of the invention.

In use, as shown in FIGS. 6-11, the user may deploy the cord 20 from the stowed position (FIG. 6) to a deployed position (FIG. 10). In doing so, the pulley 70 (e.g. rotates) and/or pulley 70 and pin 81 may slide/translate within the slot 82 of the pin and slot engagement 80 to compress or tension the biasing member thereby increasing the tension force to retract the cord that is unused during an application. When the user guides the cord 20 though a cabinet, wall, and/or plugs the cord into the outlet during installation of the appliance, the slack or unused portion of the cord may be retracted via the pulley/biasing member/pin and slot engagement into the cord/appliance housing. This may be done automatically when the user or pulling/extracting of the cord ceases. With the cord retracted automatically, the excess cord is removed from interfering with the user, maintains available space about the appliance, and reduces interference with the appliance mobility during installation. The pulley engaging the cord may also reduce the likelihood of the cord from binding or catching to prevent retraction/deployment. The pulley may maintain the arcuate curve portion or U-shape of the cord within the housing(s) during deploying/stowing. The pulley 70 and/or strain relief member 250 may stop deployment of the cord 20 or length L, or portion thereof. In some implementations, one or more cord catches 16 may maintain (e.g. releasably engage) the cord 20 in at least one deployed position of the one or more deployed positions. The cord catch 16 may be disengaged or removed (e.g. by the user) to begin retracting or allow the returning force to retract the cord.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of” or “exactly one of” “Consisting essentially of,” when used in the claims, shall have its ordinary meaning as used in the field of patent law.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms “connected,” “coupled,” “in communication with,” and “mounted,” and variations thereof herein are used broadly and encompass direct and indirect connections, couplings, and mountings. In addition, the terms “connected” and “coupled” and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A microwave cooking appliance comprising:

a housing having a cooking cavity;

a door movable between a closed position closing a front opening to define a portion of the cooking cavity and an open position different from the closed position;

a cord housing having a cord cavity and positioned within the housing;

a cord having a length, wherein the cord is positionable between at least one stowed position within the cord cavity and one or more deployed positions out of the cord cavity;

a pulley translating and rotating within the cord housing to retract the cord towards the at least one stowed position or the one or more deployed positions;

a biasing member urging the pulley in at least one linear direction;

wherein the cord housing includes an inlet and an outlet adjacent a top wall of the cord housing, wherein when in a first deployed position of the one or more deployed positions a first length portion of the length is fixed at the inlet and extends downwardly towards a bottom wall of the cord housing before arcuately turning back around the pulley towards the top wall of the cord housing and extending through the outlet, and wherein when in the first deployed position the biasing member includes a first tension force; and wherein when in a second deployed position a second length portion of the length shorter than the first length, is fixed at the inlet and extends downwardly towards the bottom wall of the cord housing before arcuately turning back around the pulley towards the top wall of the cord housing and extending through the outlet, and wherein when in the second deployed position the biasing member includes a second tension force larger than the first tension force.

2. The microwave cooking appliance of claim 1 wherein the biasing member is a compression spring.

3. The microwave cooking appliance of claim 1 further including a pin and slot engagement having a pin and slot, wherein the pulley rotatably engages the pin and translates with the pin in the slot.

4. The microwave cooking appliance of claim 3, further comprising a biasing member within the slot, wherein the pin and the pulley varies a tension force of the biasing member when translating.

5. The microwave cooking appliance of claim 1 further includes a strain relief member attaching to the cord within the cord cavity and when in a first deployed position of the one or more deployed positions stops a first length portion of the length from being deployed from the cord cavity.

6. The microwave cooking appliance of claim 1 further includes one or more cord catches maintaining the cord in at least one deployed position of the one or more deployed positions.

7. A microwave cooking appliance comprising:

a housing having a cooking cavity and a top wall, and wherein the housing includes an aperture through the top wall;

a door movable between a closed position closing a front opening to define a portion of the cooking cavity and an open position different from the closed position;

a cord having a length, wherein the cord is positionable between at least one stowed position within the housing and one or more deployed positions out of the aperture of the housing;

a pulley within the housing slidably engaging the cord between the at least one stowed position or the one or more deployed positions; and a pin and slot engagement within the housing having a pin and slot, wherein the pulley rotatably engages the pin and translates with the pin in the slot when slidably engaging the cord between the at least one stowed position and the one or more deployed positions to retract the length of the cord into the housing.

8. The microwave cooking appliance of claim 7 further including a biasing member urging the pulley in at least one linear direction.

9. The microwave cooking appliance of claim 8 wherein increasing a portion of the length of the cord from the housing increases a tension force of the biasing member.

10. The microwave cooking appliance of claim 8 wherein the biasing member is a compression spring.

11. The microwave cooking appliance of claim 8, wherein the biasing member is positioned within the slot, wherein the pin and the pulley varies a tension force to the biasing member when translating.

12. The microwave cooking appliance of claim 8, wherein the length of the cord includes a U-shape within the housing when engaging the pulley, wherein the U-shape decreases in size from the at least one stowed position towards a first deployed position of the one or more deployed positions.

13. The microwave cooking appliance of claim 8, wherein the slot extends in a linear direction parallel to an axis of the aperture of the housing.

14. The microwave cooking appliance of claim 8, further includes one or more cord catches releasably engaging the cord to maintain the cord in at least one deployed position of the one or more deployed positions.

15. A method of managing a power cord of a microwave cooking appliance, the method comprising:

providing a microwave cooking appliance housing having an aperture within the microwave cooking appliance, wherein the housing includes a cord having a length with a plug end;

stowing a first portion of the length of the cord within the housing in a stowed position;

deploying a second portion of the cord out of the housing from the stowed position through the aperture to a deployed position; and retracting a third portion of the cord within the housing using a pulley; and tensioning the pulley to increase a tension force of a biasing member when increasing the length of the cord out of the housing from the stowed position to the deployed position to retract the third portion of the cord.

16. The method of claim 15 further comprising stopping the deploying of the cord out of the aperture of the housing, wherein stopping the deploying of the cord includes a strain relief member attached to the cord.

17. The method of claim 15 further comprising sealing the cord adjacent the aperture.

18. The method of claim 15 further comprising translating and rotating the pulley when deploying the second portion of the cord out of the housing from the stowed position to the deployed position.

19. The method of claim 15 wherein the cord includes a single arcuate curve progressively and slidably engaging the pulley.

20. The method of claim 15 further comprising releasably engaging one or more cord catches to maintain the cord in at least one deployed position of the one or more deployed positions.

* * * * *